United States Patent [19]

Tanaka et al.

[11] Patent Number: 4,852,126
[45] Date of Patent: Jul. 25, 1989

[54] DIGITAL INFORMATION REPRODUCING APPARATUS

[75] Inventors: Shinichi Tanaka, Kyoto; Toshikazu Koudo, Neyagawa; Tohru Kushisaka, Higashiosaka, all of Japan

[73] Assignee: Matsushita Electric Industrial Co., Ltd., Kadoma, Japan

[21] Appl. No.: 11,916

[22] Filed: Feb. 5, 1987

[30] Foreign Application Priority Data

| Feb. 7, 1986 [JP] | Japan | 61-26408 |
| Feb. 17, 1986 [JP] | Japan | 61-32321 |
| Nov. 11, 1986 [JP] | Japan | 61-267994 |

[51] Int. Cl.$^4$ ............................................. H04L 25/06
[52] U.S. Cl. ........................................ 375/76; 375/98; 307/359
[58] Field of Search ...................... 375/76, 98, 94, 99, 375/102; 307/358, 359; 360/45

[56] References Cited

U.S. PATENT DOCUMENTS

| 3,731,199 | 5/1973 | Tazaki et al. | 375/98 |
| 4,071,829 | 1/1978 | Davis et al. | 375/98 |
| 4,363,977 | 12/1982 | Tsuda et al. | 307/358 |
| 4,547,733 | 10/1985 | Thoraval | 307/516 |
| 4,602,374 | 7/1986 | Nakamura et al. | 375/76 |
| 4,619,002 | 10/1986 | Thro | 375/98 |
| 4,625,240 | 11/1986 | Yablonski et al. | 375/98 |

Primary Examiner—Benedict V. Safourek
Assistant Examiner—Andrew J. Telesz, Jr.
Attorney, Agent, or Firm—Wenderoth, Lind & Ponack

[57] ABSTRACT

In a digital information reproducing apparatus, a digital signal having passed through a band-limited transmission system is waveform-shaped at a threshold level controlled to its optimal value so that the information can be properly read out. The apparatus includes a threshold level control circuit for controlling the threshold level to shape the waveform of the input signal. This threshold level control circuit has a first control circuit for controlling the threshold level with reference to a read clock extracted from the input signal, and a second control circuit for controlling the threshold level of a shaped signal which is obtained by waveform-shaping the input signal so that the DC component of the shaped signal becomes a predetermined value. The control of the threshold level is performed by cooperation of the first and second control circuits. The first control circuit is adapted to control the threshold level in accordance with a difference between the shaped signal obtained by waveform-shaping the input signal and the read-out signal obtained by synchronizing the shaped signal with the read clock. Thus, the threshold level for waveform-shaping a modulated channel code signal can be controlled optimally regardless of whether or not the modulation system is DC-free. The second control circuit serves to prevent a spurious lock of the first control circuit.

13 Claims, 3 Drawing Sheets

DIGITAL INFORMATION REPRODUCING APPARATUS

BACKGROUND OF THE INVENTION

1. Field of the Invention

The present invention relates to a digital information reproducing apparatus for reading out information from a digital signal obtained through a band-limited transmission system, and more particularly to an apparatus capable of controlling the threshold level of a waveform shaper so as to correctly read the digital signal.

2. Description of the Prior Art

For the purpose of transmitting digital signals at a high transfer rate or recording them at a high density, there is often employed recently a technique of digital modulation which transmits or records digital signals within a base band. In such a signal transmission using a base band, it is generally necessary to transmit even the lowest frequency range including a DC component and is further necessary to shape the rounded waveform which is deformed in the transmission line to a proper shape at a predetermined threshold level. However, there exists a problem in that an optimal threshold level drifts because some low frequency noise is prone to mix into the input signal due to temperature drift in a circuit or nonuniformity of a recording medium used. For solving such a problem, there is known a conventional method which controls the threshold level to an optimal value for elimination of any harmful influence that results from the drift of the threshold level caused by low frequency noise.

With regard to a channel code signal processed by a DC-free modulation system according to which the DC component of the signal to be transmitted is not modulated, it is possible to attain an optimal threshold level by controlling the threshold level in such a manner that the DC component of the waveform-shaped signal obtained from the transmitted input signal becomes a predetermined value. An exemplary waveform shaper for controlling the threshold level as mentioned above is disclosed in Japanese Laid-Open Patent Application No. 57 (1982)-78611.

In such a conventional waveform shaper, however, controlled retention of the threshold level at an optimal value is not achievable if the input is not a channel code signal processed by the DC-free modulation system. For example, in the so-called 2-7 code modulation employed frequently in the recent magnetic storage systems, variations occur in the DC component of the modulated channel code signal, and consequently it is impossible to attain optimal control of the threshold level by the above-noted method.

Also with respect to the channel code signal modulated by system other than a DC-free modulation system, it is still possible to accomplish optimal control of the threshold level by detecting the threshold level error with reference to a read clock extracted from the channel code signal. An exemplary waveform shaper for controlling the threshold level in this manner is disclosed in Japanese Laid-Open Patent Application No. 59 (1984)-113529, wherein the threshold level is controlled in accordance with a difference obtained from the phase difference between the rising edge of the shaped input signal and the read clock and the phase difference between the falling edge and the read clock.

However, in the method which detects the threshold level error with reference to the read clock as mentioned above, if there occurs a variation in the threshold level in such a manner that the pulse duration changes by a length comparable to the read clock period, the signal with such a pulse duration change may be erroneously recognized as the original signal. In such a case, a spurious lock state occurs where the threshold level is set to an improper value.

SUMMARY OF THE INVENTION

It is an object of the present invention to provide a digital information reproducing apparatus which is capable of controlling the threshold level optimally for shaping the waveform of a modulated channel code signal regardless of whether or not the modulation system is DC-free, and is further capable of averting a spurious lock in the control of the threshold level.

In order to accomplish this object, the present invention uses a threshold level control means, for controlling the threshold level when shaping the waveform of an input signal, which comprises a first control means for controlling the threshold level with reference to a read clock extracted from the input signal, and a second control means functioning in cooperation with the first control means and serving to control the threshold level in such a manner that the DC component of the shaped signal obtained after shaping the waveform of the input signal becomes a predetermined value.

In this constitution, the first control means is capable of optimally controlling the threshold level even if the input signal is the one processed by a modulation system that may cause variations in the DC component, and the second control means is adapted to prevent a spurious lock of the first control means.

DESCRIPTION OF THE PREFERRED EMBODIMENTS

This invention is useful both for digital data communication systems and for digital data storage systems, and will be described herein with reference to the latter.

Figure 1:
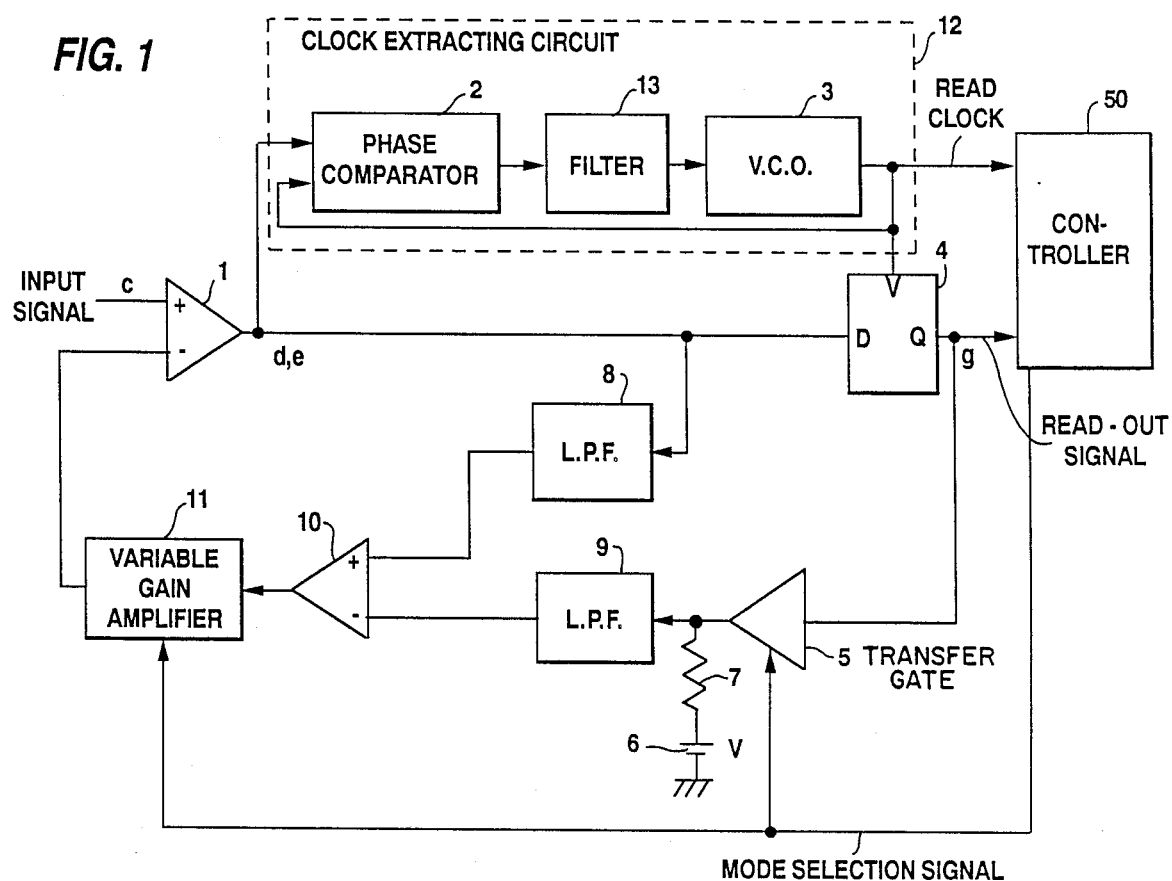
FIG. 1 is a block diagram of a preferred embodiment of the present invention.

In FIG. 1, a waveform comparator 1 is supplied with an input digital signal with a deformed waveform through a band-limited transmission system, which may be a communication channel or a recording-reproducing channel. Here a description will be given on a recording-reproducing channel as an example. The comparator 1 shapes the waveform of the input signal to produce a shaped signal. A clock extracting circuit 12 extracts a read clock from the shaped signal. The clock extracting circuit 12 is composed of a phase-locked loop (PLL) comprising a phase comparator 2, a filter 13 and a voltage controlled oscillator (V.C.O.) 3. A D-flip-flop 4 latches the shaped signal synchronously with the read clock. The synchronized read-out signal thus outputted from the D-flip-flop 4 is the same as the original signal recorded on a recording medium. The read-out signal and read clock are sent to a well-known controller 50. The controller 50 produces a mode selection signal for controlling a transfer gate 5.

When a mode selection signal is in its "H" state, the read-out signal is permitted to pass through a transfer gate 5. Low-frequency components are extracted from the shaped signal and the read-out signal respectively through low-pass filters 8 and 9. A differential amplifier 10 detects a difference between the two low-frequency components. A variable gain amplifier 11 amplifies this difference and feeds it back to the comparator 1 as a threshold level. Thus, the control loop for controlling the threshold level to an optimal value with reference to the read clock constitutes a first control means.

Figure 2:
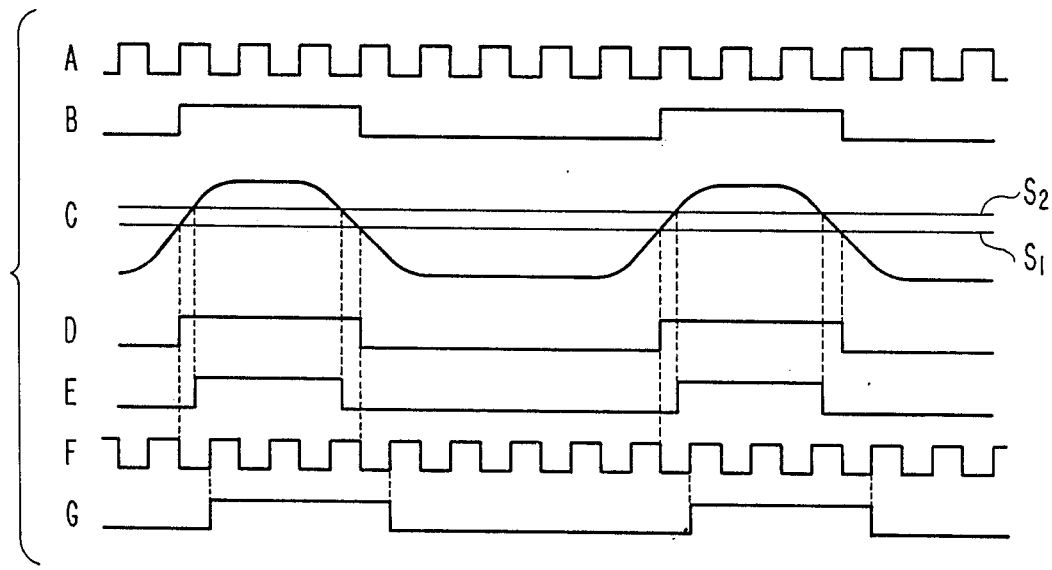
FIG. 2 is a waveform chart of signals produced in the embodiment of FIG. 1.

Referring now to the signal waveform chart of FIG. 2, the operation of the first control means will be described in further detail. In this chart, A is a write clock and B is an original digital signal to be recorded synchronously with the clock A. Denoted by C, D, E, F and G are signals obtained at points c, d, e, f and g in FIG. 1, respectively. When the digital signal B is recorded and reproduced, generally the reproduced signal has a deformed waveform as represented by C. A shaped signal D obtained by shaping the waveform of the reproduced signal C at an optimal threshold level S1 thereof comes to have the same waveform as that of the digital signal B. In the clock extracting circuit 12, a read clock F is extracted from the shaped signal D. The read clock F is substantially opposite in phase to the recording clock A. The read-out signal G produced in the D-flip-flop 4 by synchronizing the shaped signal D with the read clock F is equivalent to the one obtained by delaying the shaped signal D. Consequently, the difference between the outputs of the low-pass filters 8 and 9 is reduced to zero.

However, if the threshold level is S2, which is higher than the optimal threshold level S1, the shaped signal outputted from the comparator 1 is as represented by E, in which the duty ratio is smaller than that of the digital signal B. When the shaped signal E is synchronized with the read clock F, (in this case, the threshold level error is presumed to be not so great as to bring about a read error), the read-out signal G is obtained in a fashion similar to the foregoing case where the threshold level is S1. Therefore, the output of the low-pass filter 8 becomes smaller than that of the low-pass filter 9, whereby the threshold level of the comparator 1 is caused to change in the negative direction. Thus, the threshold level of the comparator 1 is controlled with negative feedback.

Figure 3:
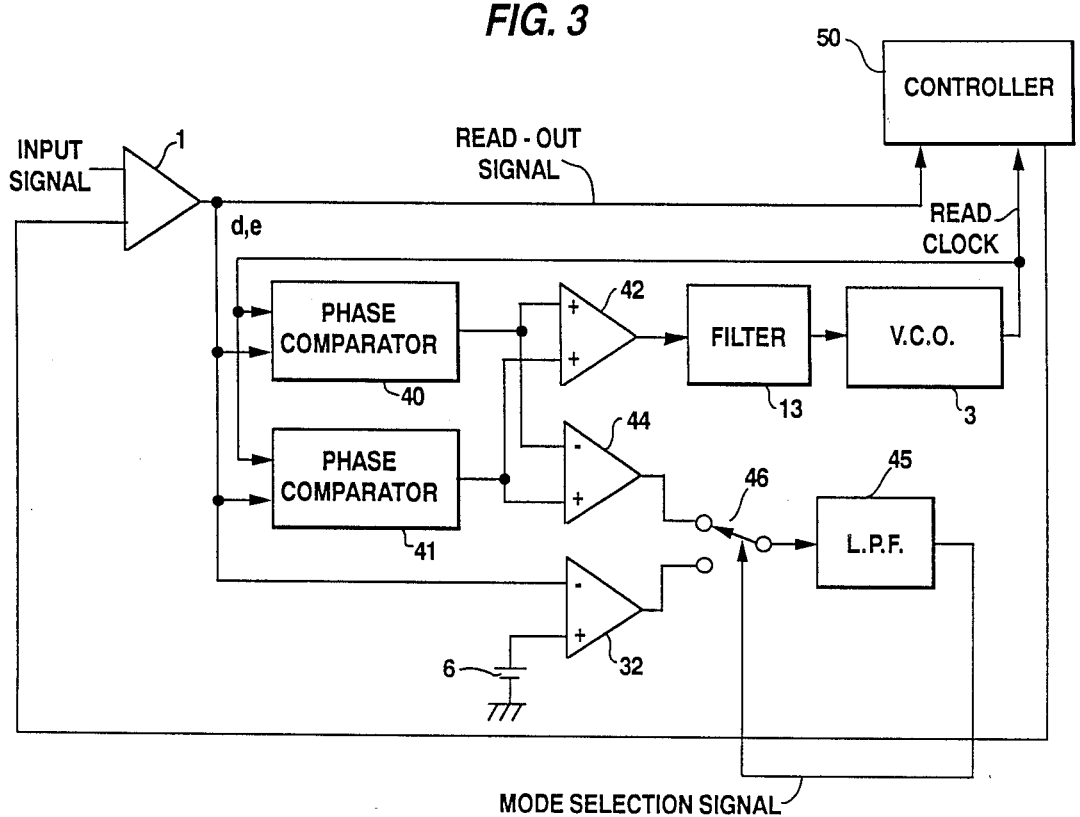
FIG. 3 is a block diagram of another embodiment of the invention.

FIG. 3 shows another embodiment of the present invention which controls the threshold level by a first control means. A first phase comparator 40 and a second phase comparator 41 respectively compare the rising edge and the falling edge of a shaped signal which is outputted from a waveform comparator 1 with a read clock outputted from a voltage controlled oscillator 3. An adder 42 serves to add the outputs of the first and second phase comparators 40 and 41 together. The first phase comparator 40, the second phase comparator 41 and the adder 42 are equivalent to the aforesaid phase comparator 2 in FIG. 1 and constitute a phase-locked loop (PLL) in combination with the filter 13 and the voltage controlled oscillator 3. In a fashion similar to the case of FIG. 1, the output of the voltage controlled oscillator 3 is used as the read clock. If the threshold level becomes higher, as will be apparent from comparison of the shaped signal D with another shaped signal E shown in FIG. 2, the rising edge lags while the falling edge leads. If the threshold level becomes lower, the rising edge leads while the falling edge lags. The threshold level error can be detected by first determining the difference between the outputs of the first and second phase comparators 40 and 41 by a differential amplifier 44, and then extracting the low-frequency component through a low-pass filter 45. The threshold level of the waveform comparator 1 can be controlled by feeding back the error thus obtained.

By referring to the read clock as mentioned above, it becomes possible to attain optimal control of the threshold level if the original of the input signal is a channel code signal processed by a system other than the DC-free modulation system. However, if the threshold level has a great deviation from its optimal value to such an extent that the pulse duration of the shaped signal varies by a length of one clock pulse or so as compared with the original digital signal, a read error is generated as a result, and the threshold level control is stabilized in a state where the pulse duration of the read-out signal G has a variation of one clock pulse in comparison with that of the original digital signal. Such a state is defined here as a "spurious lock". Although the spurious lock state is scarcely induced once the threshold level is controlled to its proper value, it may often occur at the beginning of the control operation.

For the purpose of preventing the spurious lock, the embodiment of FIG. 1 is so operated that the controller 50 changes the mode selection signal to an "L" state so as to place the transfer gate 5 in a high-impedance condition. Since the input terminal of the low-pass filter 9 is connected to a power supply 6 of a voltage V through a resistor 7, the low-pass filter 9 provides an output DC voltage corresponding to the supply voltage V. The differential amplifier 10 compares the output of the low-pass filter 8 with the output DC voltage of the low-pass filter 9, and feeds the difference back to the threshold level. Accordingly, the threshold level is locked so that the DC level of the shaped signal becomes a predetermined value. In this case, a second control means is constituted by the closed loop which controls the threshold level by comparing the low-frequency component of the shaped signal with the DC voltage V. Although there exists no possibility that the aforementioned spurious lock is induced under the control of the second control means, the threshold level is not always exactly controlled to its optimal value because the low-frequency component of the information-carrying digital signal does not always retain a fixed voltage. However, if the recorded digital signal is such that the DC value thereof is constant and none of low-frequency component is contained, the threshold level can be kept at its optimal value by the second control means.

In FIG. 3, the second control means is constituted by a differential amplifier 32 which compares the read-out signal from the comparator 1 with a reference voltage generated by a reference voltage source 6, and the low-pass filter 45. A selection switch is responsive to the mode selection signal for selecting the second control means when the mode selection is an "L" and for selecting the first control means when the mode selection signal is an "H".

When recording information by dividing a recording medium into a plurality of sectors, a repetition signal of a predetermined pattern is recorded often at the beginning of the data signal so as to maintain the clock extracting circuit in synchronism. For this reason, the repetition signal is termed here as a "SYNC signal". In the SYNC signal portion, the threshold level can be kept at its optimal value by the second control means.

Figure 4:
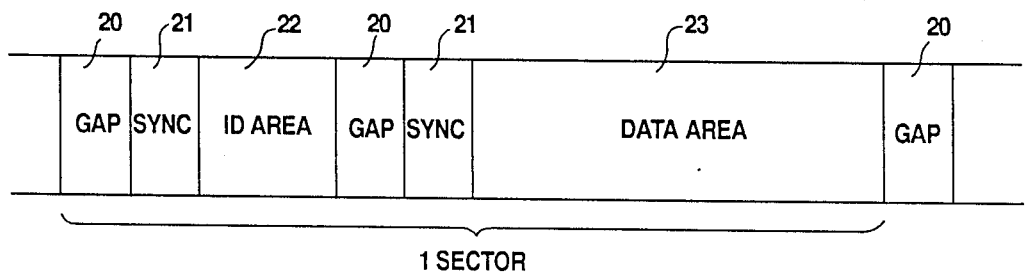
FIG. 4 is a conceptual diagram of an exemplary format on a recording medium.

FIG. 4 shows an exemplary format where each sector includes an ID area 22 for recording an address and so forth, and a data area 23 for recording a data signal which carries the information to be recorded. The individual areas are separated from each other by a gap 20. At the time of recording an ID signal or data signal in such areas, a SYNC signal 21 is added to the beginning of each area, so that the SYNC signal 21 and the following ID signal or data signal are recorded continuously.

When reading out the information from such a recording medium, the controller 50 initially sets the mode selection signal to an "L" state to set the second control means in an active condition. In this stage, the gain of the variable gain amplifier 11 is increased by the mode selection signal so that the threshold-level control loop is ready for a fast response. Upon the arrival of the SYNC signal 21, the phase-locked loop of the clock extracting circuit 12 and the threshold-level control loop are promptly synchronized so that the predetermined pattern of the SYNC signal 21 is recognized by the controller 50. The controller 50, when recognized the SYNC signal 21, changes the mode selection signal to an "H" state so that the threshold level is controlled by the first control means. Thus, a shaped signal of the optimal level can be obtained despite variations of the low-frequency component in the data signal or ID signal. In this state, since the variable gain amplifier 11 is switched to a small-gain condition by the mode selection signal, the threshold level control operation is hardly affected by noise or the like to consequently ensure a stable and accurate reading of the information.

Incidentally, it is known that the controller 50 sets to an "H" a SYNC detected signal (which has been initially reset) when it detects the SYNC signal 21, and resets to an "L" the SYNC detected signal after having read the subsequent data. This known SYNC detected signal can be directly used as the mode selection signal. Alternatively, the controller 50 may produce the mode selection signal which is made an "H" in response to a first received SYNC signal after the start of the information reproducing operation. Furthermore, the mode selection signal may not be necessarily controlled in response to the SYNC signal. The mode selection signal may be controlled by a timer which determines a time when the operation of the apparatus is stabilized after the start time. Also, the mode selection signal may be controlled in accordance with any other proper manner by the controller 50. Moreover, information for controlling the mode selection signal may be contained in the input signal of the apparatus.

Figure 5:
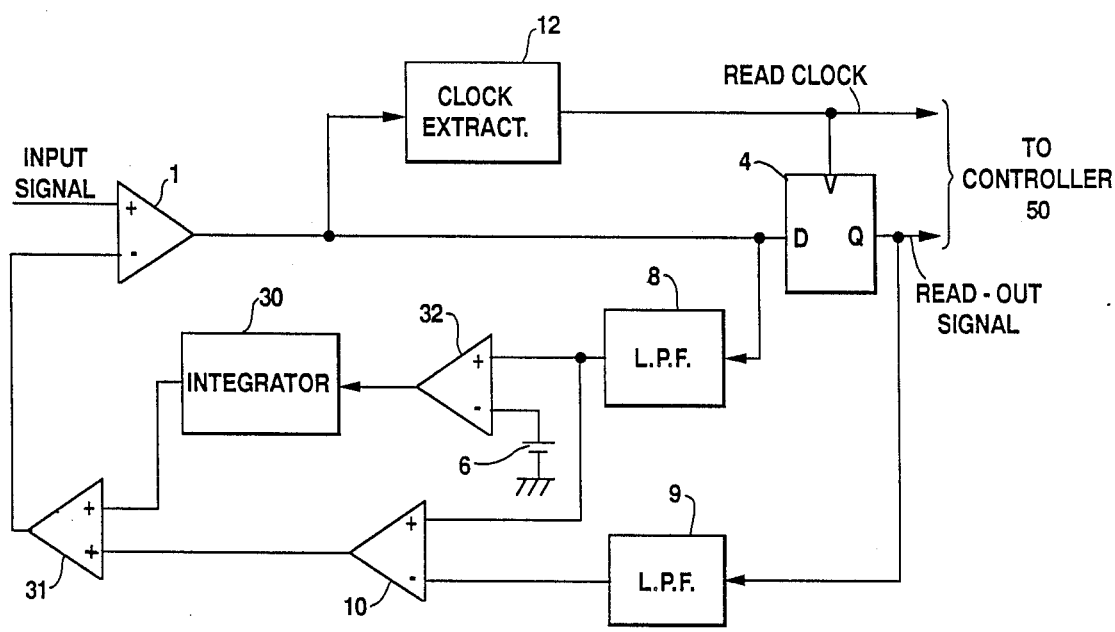
FIG. 5 is a block diagram of a further embodiment of the invention.

FIG. 5 shows a further embodiment of the invention which is effective for a channel code signal processed by a DC-free modulation system which controls the original of an input signal in such a manner that its DC component becomes a predetermined value. In this diagram, a differential amplifier 10 compares the output of a low-pass filter 8, obtained by extracting the low-frequency component of a shaped signal with the output of another low-pass filter 9 obtained by extracting the low-frequency component of a read-out signal to detect a threshold level error in a first control means. Another differential amplifier 32 compares the output of the low-pass filter 8 with a fixed voltage V to detect a threshold level error in a second control means. The threshold level of a waveform comparator 1 is controlled in accordance with the sum of the output signal from an integrator 30 which integrates the threshold level error detected by the second control means and the threshold level error detected by the first control means.

Figure 6:
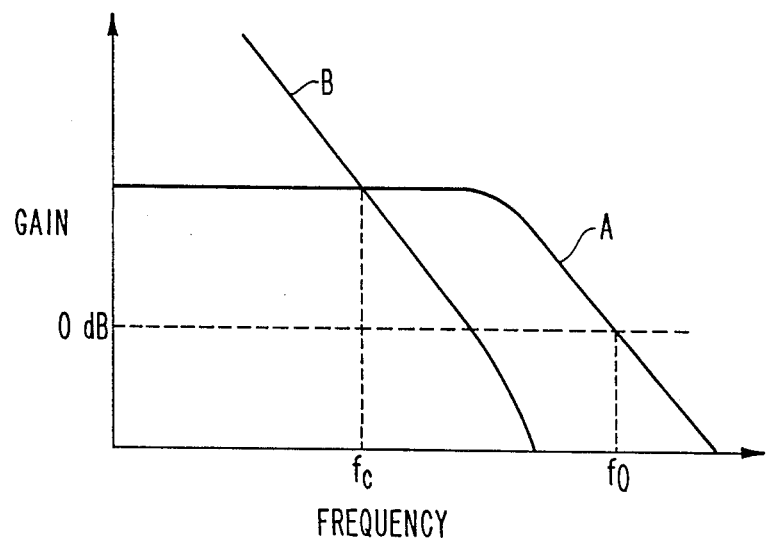
FIG. 6 graphically shows the gain characteristic of a threshold-level control loop in the embodiment of FIG. 5.

FIG. 6 graphically shows exemplary gain characteristics of the control loops in the respective modes. In this graph, A and B respectively represent the gain characteristic of the first and second control means. The circuit configuration is so designed that, as shown in FIG. 6, the second control means is dominant for a direct current while the first control means is dominant at a crossover frequency of where the open-loop gain of the first control becomes 0 dB. The threshold level is controlled by the first control means in a band from a frequency fc where the gain characteristics A and B cross each other to the frequency of, so that optimal control of the threshold level can be attained even when the original digital signal contains some frequency component of this band. Since the second control means is dominant in the frequency range below fc, if a spurious lock is induced due to some reason in the threshold level control performed by the first control means, there exists no possibility that such state is retained for a long time, because the spurious lock is promptly eliminated by the second control means to eventually resume the proper threshold level.

According to the present invention, as described hereinabove, the threshold level for shaping the waveform of the input signal can be controlled optimally with reference to a read clock extracted from the input signal even if the original channel code signal is not one processed by a DC-free modulation system, and a combination with the threshold level control performed by the second control means realizes a solution of the known problem that the threshold-level control loop is prone to cause a spurious lock.

It is to be understood that the aforementioned drawback of readily inducing a spurious lock of the first control means is not inherent in the above-described constitution, and it results essentially from reference to the read clock. Therefore the first control means in the embodiment mentioned above is merely illustrative, and it is obvious that the present invention is effective with respect to any other modified constitution as well.

What is claimed is:

1. A digital information reproducing apparatus comprising:
   a waveform shaping means for comparing a level of an input signal with a threshold level so as to thereby obtain a reproduced digital signal;
   a clock extracting means for extracting a read clock from the reproduced digital signal; and
   a threshold level control means for controlling the threshold level, comprising a first control means for detecting a threshold level error from the reproduced digital signal and the read clock and for controlling the threshold level so as to cancel the threshold level error, and a second control means for controlling the threshold level so that a DC component of the reproduced digital signal become equal to a predetermined value.

2. An apparatus as claimed in claim 1, further comprising a selector means for selecting one of the first and second control means.

3. An apparatus as claimed in claim 2, wherein the selector means selects the second control means in response to a predetermined pattern of a repetitive header area inputted prior to an information-carrying area of the input signal, and selects the first control means after recognizing the predetermined pattern from the reproduced digital signal.

4. An apparatus as claimed in claim 2, wherein the second control means is faster in response than the first control means.

5. An apparatus as claimed in claim 1, wherein the first and second control means operate simultaneously and have such characteristics than an open-loop gain of the second control means is higher than that of the first control means for a direct current but is smaller than 1 at a cross-over frequency where the open-loop gain of the first control means is equal to 1.

6. A digital information reproducing apparatus comprising:
   a waveform shaping means for comparing a level of an input signal with a threshold level so as to thereby obtain a reproduced digital signal;
   a clock extracting means for extracting a read clock from the reproduced digital signal; and
   a threshold level control means for controlling the threshold level, comprising a first control means for detecting a threshold level error from the reproduced digital signal and the read clock and for controlling the threshold level so as to cancel the threshold level error, and a second control means for controlling the threshold level so that a DC component of the reproduced digital signal becomes equal to a predetermined value;
   wherein the first control means comprises: a means for synchronizing the reproduced digital signal with the read clock to obtain a synchronized digital signal; a gate for selectively passing the synchronized digital signal; a first low-pass filter for passing a low frequency component of the reproduced digital signal; a second low-pass filter for passing a low frequency component of the synchronized digital signal output from said gate; and a differential amplifier for producing a difference, as the threshold level error, between the low frequency components from the first and second low-pass filters; and
   wherein the second control means comprises: the first low-pass filter, a reference level source coupled to the differential amplifier via the second low-pass filter for generating a reference DC level, and the differential amplifier for producing a difference between the low frequency component from the first low-pass filter and the reference DC level; and
   wherein an output signal from the differential amplifier is used as the threshold level.

7. An apparatus as claimed in claim 6, further comprising a selector means for producing a mode selection signal for controlling the gate so that the gate does not pass the synchronized digital signal whereby the first control means does not operate.

8. An apparatus as claimed in claim 7, wherein the selector means produces the mode selection signal in response to a predetermined pattern of a repetitive header area inputted prior to an information-carrying area of the input signal, and terminates the mode selection signal after recognizing the predetermined pattern from the reproduced digital signal.

9. An apparatus as claimed in claim 7, further comprising a variable gain amplifier for amplifying the output signal from the differential amplifier, the variable gain amplifier being responsive to the mode selection signal for decreasing its gain to reduce a response of the threshold level control means.

10. A digital information reproducing apparatus comprising:
    a waveform shaping means for comparing a level of an input signal with a threshold level so as to thereby obtain a reproduced digital signal;
    a clock extracting means for extracting a read clock from the reproduced digital signal;
    a threshold level control means for controlling the threshold level, comprising a first control means for detecting a threshold level error from the reproduced digital signal and the read clock and for controlling the threshold level so as to cancel the threshold level error, and a second control means for controlling the threshold level so that a DC component of the reproduced digital signal becomes equal to a predetermined value; and
    a selector means for producing a mode selection signal in response to a predetermined pattern of a repetitive header area inputted prior to an information-carrying area of the input signal, and for terminating the mode selection signal after recognizing the predetermined pattern from the reproduced digital signal; and
    a switch means for normally selecting the first control means and being responsive to the mode selection signal for selecting the second control means during a duration of the mode selection signal;
    wherein the first control means comprises: a first phase comparator for comparing the phase of a leading edge of the reproduced digital signal with the phase of the read clock; a second phase comparator for comparing the phase of a trailing edge of the reproduced digital signal with the phase of the read clock; a first differential amplifier for producing a difference signal between output signals from the first and second phase comparators; and a low-pass filter coupled through a switch means to the first differential amplifier for passing a low frequency component of the difference signal as the threshold level error; and
    wherein the second control means comprises: a second differential amplifier for producing a difference signal between the reproduced digital signal and a reference DC level; and the low-pass filter coupled through the switch means to the second differential amplifier for passing a low frequency component of the difference signal produced by the second differential amplifier; and
    wherein an output signal from the low-pass filter is used as the threshold level.

11. A digital information reproducing apparatus comprising:
    a waveform shaping means for comparing a level of an input signal with a threshold level so as to thereby obtain a reproduced digital signal;
    a clock extracting means for extracting a read clock from the reproduced digital signal; and
    a threshold level control means for controlling the threshold level, comprising a first control means for detecting a threshold level error from the reproduced digital signal and the read clock and for controlling the threshold level so as to cancel the threshold level error, and a second control means for controlling the threshold level so that a DC component of the reproduced digital signal becomes equal to a predetermined value;

wherein said first control means comprises: a means for synchronizing the reproduced digital signal with the read clock to obtain a synchronized digital signal; a first low-pass filter for passing a low frequency component of the reproduced digital signal; a second low-pass filter for passing a low frequency component of the synchronized digital signal; and a first differential amplifier for producing a difference signal, as the threshold level error, between the low-frequency components from said first and second low-pass filters, where said second control means comprises: said first low-pass filter, a second differential amplifier for producing a difference signal between the low-frequency component from said first low-pass filter and a reference DC level; and an integrator for integrating the difference signal from said second differential amplifier; and wherein the difference signal from said first differential amplifier and an output signal from said integrator are added by an adder to obtain the threshold level.

12. An apparatus as claimed in claim 11, wherein the input signal is a DC free signal.

13. An apparatus as claimed in claim 11, wherein an open-loop gain of the second control means is higher than that of the first control means but is smaller than 1 at a cross-over frequency where the open-loop gain of the first control means is equal to 1.

* * * * *